US011265278B2

(12) United States Patent
Choi

(10) Patent No.: US 11,265,278 B2
(45) Date of Patent: Mar. 1, 2022

(54) APPARATUS OF PROCESSING DIALOG BASED MESSAGE OBJECT AND METHOD THEREOF

(71) Applicants: DELTA PDS CO., LTD., Seoul (KR); Jae Ho Choi, Seoul (KR)

(72) Inventor: Jae Ho Choi, Seoul (KR)

(73) Assignees: DELTA PDS CO., LTD., Seoul (KR); Jae Ho Choi, Seoul (KR)

( * ) Notice: Subject to any disclaimer, the term of this patent is extended or adjusted under 35 U.S.C. 154(b) by 0 days.

(21) Appl. No.: 16/746,019

(22) Filed: Jan. 17, 2020

(65) Prior Publication Data
US 2021/0021556 A1  Jan. 21, 2021

(30) Foreign Application Priority Data

Jul. 19, 2019 (KR) .................. 10-2019-0087851
Jul. 26, 2019 (KR) .................. 10-2019-0091005
Jan. 6, 2020 (KR) .................. 10-2020-0001637

(51) Int. Cl.
*H04L 12/58* (2006.01)
*H04L 29/06* (2006.01)
(Continued)

(52) U.S. Cl.
CPC ............ *H04L 51/16* (2013.01); *H04L 51/066* (2013.01); *H04L 65/403* (2013.01)

(58) Field of Classification Search
CPC ....... H04L 51/16; H04L 65/403; H04L 45/70; H04L 45/308; H04L 51/066
See application file for complete search history.

(56) References Cited

U.S. PATENT DOCUMENTS

2005/0223057 A1* 10/2005 Buchheit ................. G06F 16/24
 709/203
2016/0359993 A1* 12/2016 Hendrickson ........... H04L 51/32
(Continued)

FOREIGN PATENT DOCUMENTS

KR  10-1695917 B1  1/2017
KR  10-1760051 B1  7/2017
(Continued)

OTHER PUBLICATIONS

Korean Office Action for related KR Application No. 10-2019-0091005 dated Nov. 27, 2020 from Korean Intellectual Property Office.
(Continued)

*Primary Examiner* — Backhean Tiv
*Assistant Examiner* — Jihad K Boustany
(74) *Attorney, Agent, or Firm* — Paratus Law Group, PLLC

(57) ABSTRACT

Provided are an apparatus of processing a dialog based message object and a method thereof, in which the apparatus of processing a dialog based message object and the method thereof include a memory and a processor electrically connected to the memory. The processor creates a dialog in which at least one user participates, provides the dialog with a message thread including an existing message object spontaneously created by the at least one user, receives an unspecified or specified message object from one of the at least one user and additionally inserts the received unspecified or specified message object into the message thread, detects whether a corresponding specified user reads the specified message object in the message thread to count the number of unread specified message objects, and provides the corresponding specified user with the number of unread specified message objects.

12 Claims, 8 Drawing Sheets

(51) Int. Cl.
*H04L 51/00* (2022.01)
*H04L 51/066* (2022.01)
*H04L 65/403* (2022.01)

(56) References Cited

U.S. PATENT DOCUMENTS

| | | | |
|---|---|---|---|
| 2016/0364368 A1* | 12/2016 | Chen | G06F 3/0482 |
| 2017/0336926 A1* | 11/2017 | Chaudhri | G06F 3/04845 |
| 2018/0278563 A1* | 9/2018 | Frost | H04L 51/32 |
| 2018/0331996 A1* | 11/2018 | Zhang | H04L 51/16 |
| 2019/0014070 A1* | 1/2019 | Mertvetsov | G06N 3/08 |
| 2019/0138160 A1* | 5/2019 | Deets, Jr. | G06F 3/0482 |
| 2019/0149651 A1* | 5/2019 | Tokuchi | H04M 1/72552 455/466 |
| 2019/0245821 A1* | 8/2019 | Crowe | H04W 4/12 |
| 2021/0168103 A1* | 6/2021 | Crusson | G06Q 10/10 |

FOREIGN PATENT DOCUMENTS

| | | |
|---|---|---|
| KR | 10-2017-0088659 A | 8/2017 |
| KR | 10-2018-0068400 A | 6/2018 |
| KR | 10-2018-0083585 A | 7/2018 |
| KR | 10-2018-0109785 A | 10/2018 |
| KR | 10-2019-0022119 A | 3/2019 |

OTHER PUBLICATIONS

Korean Office Action for related KR Application No. 10-2020-0001637 dated Jun. 2, 2021 from Korean Intellectual Property Office.

Collabee, "Introducing the new Collab", Internet blog (http://blog.naver.com/collabee/221502958730), Apr. 1, 2019, pp. 1-18.

\* cited by examiner

APPARATUS OF PROCESSING DIALOG BASED MESSAGE OBJECT AND METHOD THEREOF

CROSS REFERENCE TO PRIOR APPLICATIONS

This application claims priority from and the benefit of Korean Patent Application Nos. 10-2019-0087851 filed on Jul. 19, 2019, 10-2019-0091005 filed on Jul. 26, 2019, and 10-2020-0001637 filed on Jan. 6, 2020, which are all hereby incorporate by reference in their entirety.

BACKGROUND

Field of the Invention

The present invention relates to a technology for processing a dialog based message object, and more particularly, to an apparatus of processing a dialog based message object and a method thereof capable of enabling users to smoothly perform a task through an interaction between users.

Related Art

An Internet messenger may be implemented as a dialog that corresponds to an application for delivering messages including texts or graphics between users and participates by multiple users. With the development of mobile environment, mobile messengers (e.g., KakaoTalk, Line, and Facebook) are actively used as a means of communicating user's intention to the other party through a message. The Internet messenger can inform a user whether the other party checks a message and the other party participates in the dialog.

However, as the number of users using the Internet messenger suddenly increases, messages created in the dialog of the Internet messenger have also increased. Accordingly, a user is hard to check messages one by one among numerous messages in a dialog in which a large number of users participate, and a time loss is expected.

Therefore, as the number of messages in the dialog suddenly increases, when a user participating in a dialog does not read messages among messages specified to the user, there is a need for a technology for making it easier for the specified user to check the messages.

Korean Patent No. 10-1695917 B 1 issued Jan. 12, 2017 (Application No. 10-2015-0115669 filed Aug. 17, 2015) relates to a method, a system, and a recording medium technology for managing a group message, and discloses a technology for managing messages transmitted and received to and from a recipient who receives a group message from a plurality of recipients by bundling the messages with a group message.

RELATED ART DOCUMENT

Patent Document

Korean Patent No. 10-1695917 B1 (Jan. 12, 2017) (Application No. 10-2015-0115669 filed Aug. 17, 2015)

SUMMARY

The present invention provides an apparatus of processing a dialog based message object and a method thereof capable of enabling users to smoothly perform a task through an interaction between users.

The present invention also provides an apparatus of processing a dialog based message object and a method thereof capable of definitely understanding a message object provided to a specified user by implementing a message object by identifying a non-specified message object and a specified message object.

The present invention also provides an apparatus of processing a dialog based message object and a method thereof capable of enabling both a message provider and a message recipient to efficiently manage a specified message by detecting whether to read a specified message object.

The present invention also provides an apparatus of processing a dialog based message object and a method thereof capable of managing task processing flow by using a task object as a type of a specified message object.

In an aspect, an apparatus of processing a dialog based message object and a method thereof includes a memory and a processor electrically connected to the memory. The processor creates a dialog in which at least one user participates, provides the dialog with a message thread including an existing message object spontaneously created by the at least one user, receives an unspecified or specified message object from one of the at least one user and additionally inserts the received unspecified or specified message object into the message thread, detects whether a corresponding specified user reads the specified message object in the message thread to count the number of unread specified message objects, and provides the corresponding specified user with the number of unread specified message objects.

The processor may detect whether to correspond to a task object (1) that includes a task creator, a task handler, a task content, and a task state as an independent message object used for task processing within the dialog and (2) updates the task state by the task creator or the task handler.

The processor may update the task state according to a predefined task processing flow through a specified message processor that is performed by the task creator or the task handler or performed according to a specific event, and change the corresponding specified user according to the updated task state.

The processor may request the task creator to evaluate the task content as the specified message object and record the task evaluation in the task object when the task handler receives a task completion as the task state.

The processor may create a task deadline event as the specific event according to a task deadline in the task object to remind the task handler of the task content as the specified message object through the specified message processor.

The processor may continuously provide the task handler with the task content as a push notification regardless of a connection of the dialog by the task handler when the task deadline passes.

The processor may add the task object to the message thread as the specified message object.

The processor may extract the task object from the message thread according to the request of the task handler and provide the extracted task object to the dialog.

The processor may provide the specified user with the number of unread specified message objects and the number of unread unspecified message objects of the at least one user for the specified message object and the unspecified message object in the message thread.

The processor may provide the corresponding specified user with the number of unread specified message objects and the number of unread unspecified message objects for the message object in the message thread as a badge of the dialog.

The processor may detect a connection of the specified user, and provide a specified user connection event to a specified message processor when the number of unread specified message objects is one or more to inform the dialog of the existence of the unread specified message object.

In another aspect, a method of processing a dialog based message object performed by an apparatus of processing a dialog based message object including a memory and a processor electrically connected to the memory, includes:

creating a dialog in which at least one user participates, providing a dialog with a message thread including an existing message object spontaneously created by the at least one user, receiving an unspecified or specified message object from one of the at least one user and additionally inserting the received unspecified or specified message object into the message thread, detecting whether a corresponding specified user reads the specified message object in the message thread to count the number of unread specified message objects; and providing the corresponding specified user with the number of unread specified message objects.

DETAILED DESCRIPTION

Figure 1:
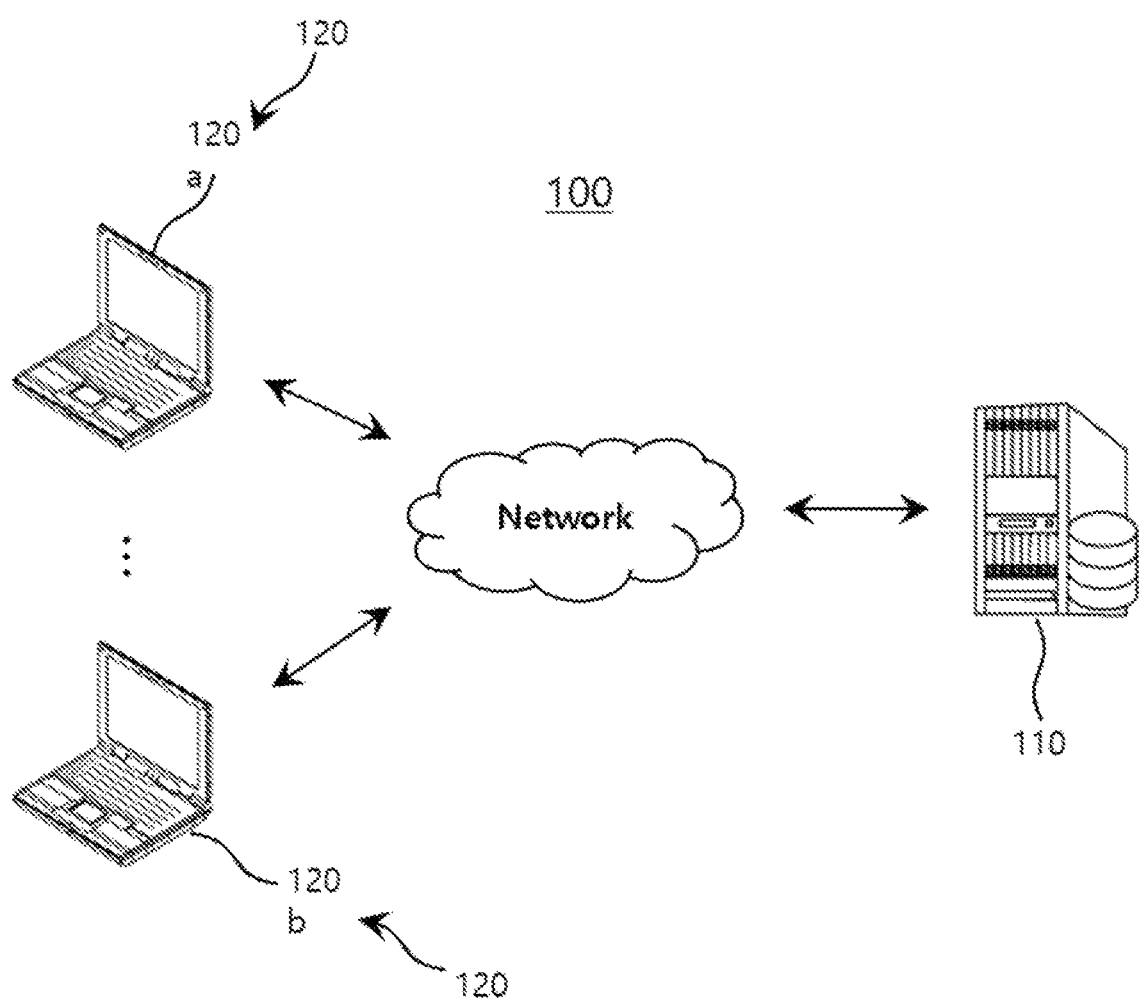
FIG. 1 is a diagram illustrating a system 100 of processing a dialog based message object according to an embodiment of the present invention.

Description of the present disclosure is only an embodiment for structural or functional description, and therefore the scope of the present disclosure should not be construed as limited to embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to identify one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Meanwhile, other expressions describing a relationship between components, that is, "between", "directly between", "neighboring to", "directly neighboring to" and the like, should be similarly interpreted.

It should be understood that the singular expression include the plural expression unless the context clearly indicates otherwise, and it will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

In each step, an identification code (for example, a, b, c, and the like) is used for convenience of description, and the identification code does not describe the order of each step, and each step may be different from the specified order unless the context clearly indicates a particular order. That is, the respective steps may be performed in the same sequence as the described sequence, be performed at substantially the same time, or be performed in an opposite sequence to the described sequence.

The present disclosure can be embodied as computer readable code on a computer readable recording medium, and the computer readable recording medium includes all types of recording devices in which data can be read by a computer system. Examples of the computer readable recording medium may include a read only memory (ROM), a random access memory (RAM), a compact disk read only memory (CD-ROM), a magnetic tape, a floppy disk, an optical data storage, or the like. In addition, the computer readable recording medium may be distributed in computer systems connected to each other via a network, such that the computer readable codes may be stored in a distributed scheme and executed.

Unless defined otherwise, all the terms used herein including technical and scientific terms have the same meaning as meanings generally understood by those skilled in the art to which the present disclosure pertains. It should be understood that the terms defined by the dictionary are identical with the meanings within the context of the related art, and they should not be ideally or excessively formally defined unless the context clearly dictates otherwise.

FIG. 1 is a diagram illustrating a system 100 of processing a dialog based message object according to an embodiment of the present invention.

Referring to FIG. 1, a system 100 of processing a dialog based message object includes an apparatus 110 of processing a dialog based message object and a user terminal 120.

The apparatus 110 of processing a dialog based message object corresponds to a computing device that can be connected to the user terminal 120 via a network. In one embodiment, the apparatus 110 of processing a dialog based message object may manage a group of participating members via the user terminal 120.

In one embodiment, the apparatus 110 of processing a dialog based message object may manage the user terminal 120 of the group of the members through an agent installed in the user terminal 120. Here, the agent may correspond to computer software that can be installed on the user terminal 120 and connect the user terminal 120 to the apparatus 110 of processing a dialog based message under the approval of the user terminal 120 to process the dialog based message object.

The user terminal 120 may correspond to a computing apparatus that may be connected to the apparatus 110 of processing a dialog based message object via a network, and may be used by a user who participates in a dialog. For example, the user terminal 120 may be implemented as a desktop, a laptop, a tablet PC or a smartphone.

Figure 2:
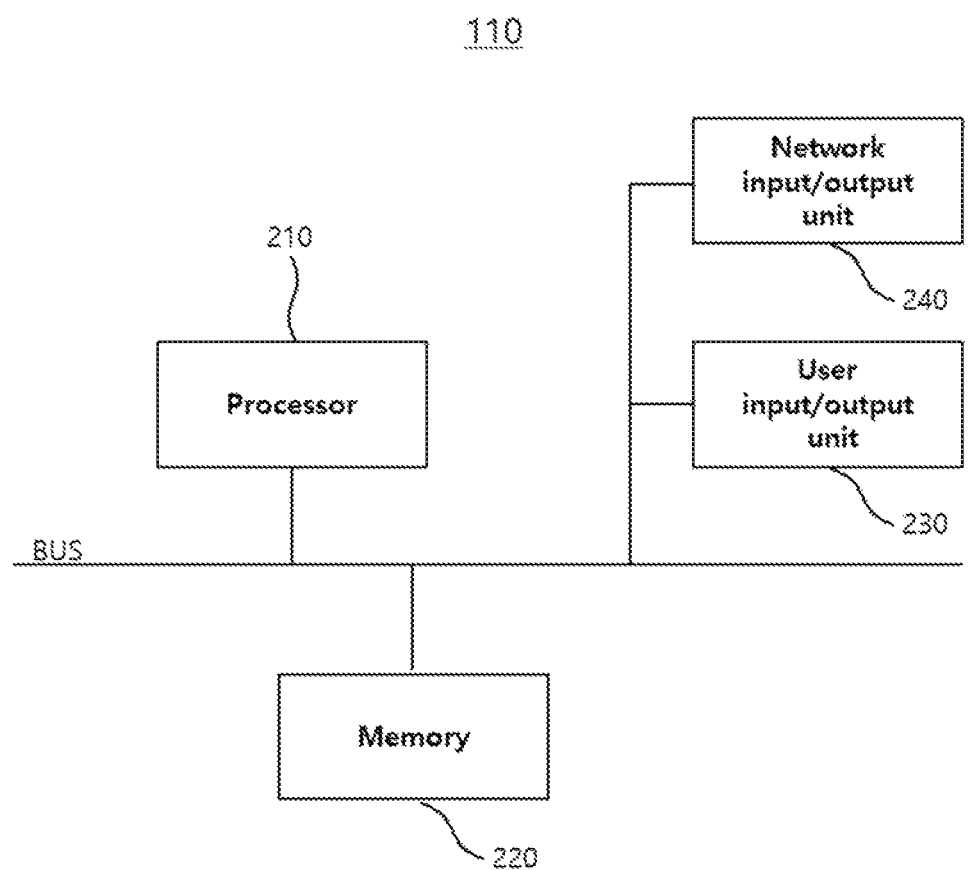
FIG. 2 is a block diagram of an apparatus 110 of processing a dialog based message object 110 in FIG. 1.

FIG. 2 is a block diagram of the apparatus 110 of processing a dialog based message object 110 in FIG. 1.

Referring to FIG. 2, the apparatus 110 of processing a dialog based message object may include a processor 210, a memory 220, a user input and output unit 230, and a network input and output unit 240.

The processor 210 may control overall operations of the apparatus 110 of processing a dialog based object, and may be electrically connected to the memory 220, the user input and output unit 230, and the network input and output unit 240 to control a data flow therebetween.

In one embodiment, the processor 210 may execute a dialog based message object processing procedure, and may read a message object from the memory 220 or write the message object in the memory 220 during this execution.

More detailed operations of the processor 210 will be described with reference to FIG. 3.

The memory 220 may store data used to process the dialog based message object processing procedure. In one embodiment, the memory 220 may be implemented as a nonvolatile memory such as a solid state disk (SSD) or a hard disk drive (HDD). In another embodiment, the memory 220 may be implemented as a volatile memory such as random access memory (RAM).

The user input and output unit 230 may be used to input a message object in the dialog and may be implemented as a mouse, a trackball, a touch pad, a graphic tablet, a scanner, a touch screen, a keyboard, or a pointing device. The user input and output unit 230 may be used to represent the message object in the dialog and can be implemented as a monitor or a touch screen.

The network input and output unit 240 may correspond to a hardware device that supports data communication with the user terminal 120. For example, the network input and output unit 240 may include an adapter for local area network (LAN) communication.

Figure 3:
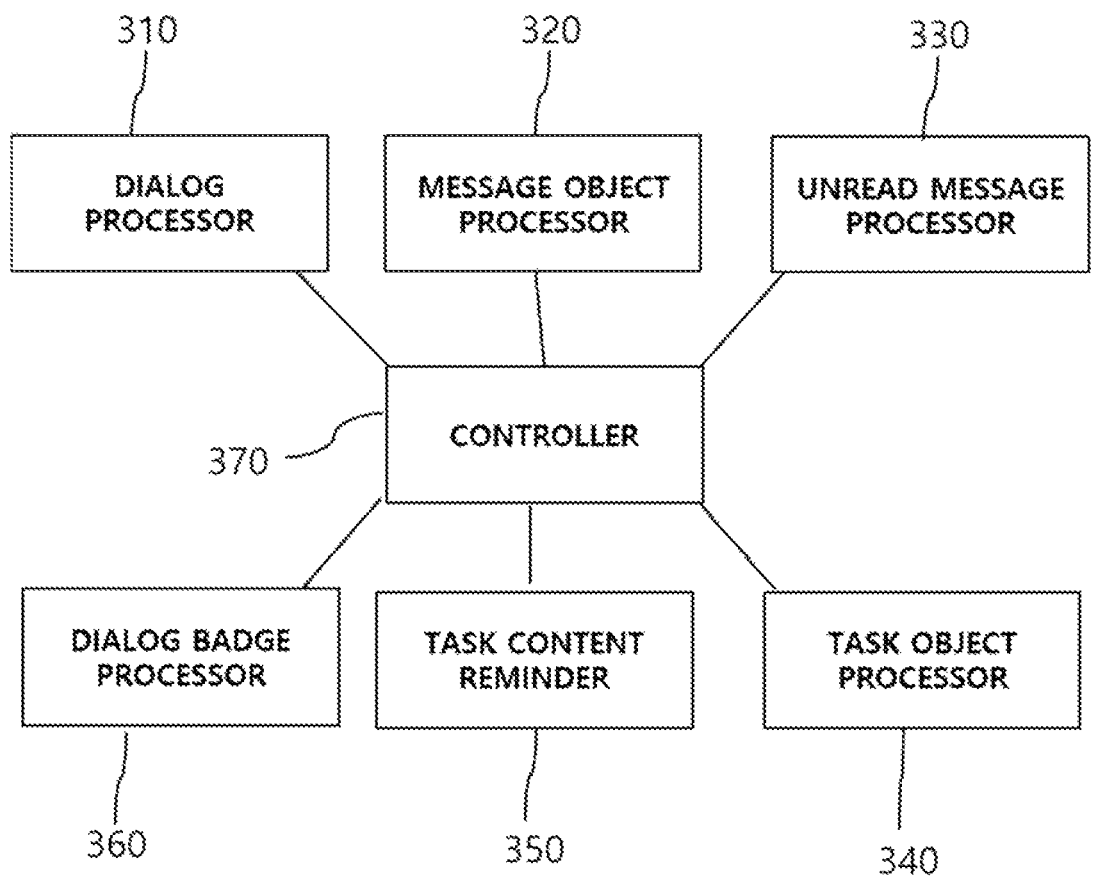
FIG. 3 is a block diagram illustrating functional elements of a processor in FIG. 2.

FIG. 3 is a block diagram illustrating functional elements of the processor in FIG. 2.

Referring to FIG. 3, from a functional point of view, the processor 210 may include a dialog processor 310, a message object processor 320, an unread message processor 330, a task object processor 340, a task content reminder 350, a dialog badge processor 360, an a controller 370.

The dialog processor 310 may create a dialog in which at least one user participates. Here, each of the at least one user can access the dialog via the user terminal 120. The dialog processor 310 provides a dialog with a message thread that contains, in times series, the existing message objects that are spontaneously created by at least one user. The dialog may correspond to a meeting space on cyber in which at least one user participates, and the message thread may be substantiated in the dialog as a set of message objects connected in time series that are provided by the at least one user. In one embodiment, the dialog processor 310 may provide a dialog through a display module in the user terminal 120 and provide the message thread through the dialog.

The message object processor 320 may process message objects transmitted and received between users participating in the dialog. Here, the message object is an entity including a message created by a user, and the message does not necessarily mean text, but may include a complex entity composed of at least one of texts, voice, photos, videos, or task objects. The message object processor 320 may receive an unspecified or specified message object from one of the at least one user and additionally insert the received unspecified or specified message object to the message thread. The unspecified message object may include a message object that does not specify a specific user, and the specified message object may include a message object that specifies a specific user. For example, when the message object processor 320 allows [user A] to specify [user B] to transmit a message object containing the message "Please perform task evaluation" through a dialog, the message object processor 320 may add an object to the message thread and allow the [user B] to identify the specified message object. According to an embodiment, when the specified message object is received, the message object processor 320 may notify the specified user of the arrival of the message object in real time.

The unread message processor 330 detects whether the specified user has read the specified message object in the message thread, and counts the number of unread specified message objects. The message thread may include five specified message objects that specify the [user A] and three specified message objects that specify the [user B]. For example, it may be assumed that the [user A] reads one of five specified message objects and two of three specified message objects that specifies the [user B]. In addition, it may be assumed that the [User B] reads two of five specified message objects that specifies the [User A] and reads one of three specified message objects that specifies the [User B]. The unread message processor 330 may count the number of unread specified message objects as four from the viewpoint of the [user A], and count the number of unread specified message objects as two from the viewpoint of the [user B]. The unread message processor 330 may provide the specified user with the number of unread specified message objects. For example, the unread message processor 330 may provide the [user A] with the number of unread specified message objects as four, and provide the [user B] with the number of unread specified message objects as two. That is, the unread message processor 330 may provide each specified user with the number of unread specified message objects that is not read by each specified user.

In addition, the unread message processor 330 may calculate the number of unread unspecified message objects, which are not read by at least one user (that is, all users participating in the dialog), in the message thread. The message thread may include five specified message objects and three unspecified message objects that specify the [user A]. For example, when the [user A] reads one of five specified message objects and one of three unspecified message objects, the unread message processor 330 may provide the [user A] with the number of unread specified message objects as four and the number of unread unspecified message objects as two from the viewpoint of the [user A]. That is, the unread message processor 330 may calculate the number of unread specified message objects and the number of unspecified message objects, respectively, and provide the calculated number of specified message objects and unspecified message objects to the corresponding user.

The unread message processor 330 may provide the number of users who does not read the unspecified message object in the message thread. The message thread may contain two unspecified message objects, and the number of users (that is, dialog participants) participating in the dialog may correspond to 10. For example, when four of ten dialog participants read a first unspecified message object, the unread message processor 330 may provide the number of users who does not read the first unspecified message object as six, and when two of ten dialog participants reads a second unspecified message object, the unread message processor 330 may provide the number of users who does not read the second unspecified message object as eight. That is, the unread message processor 330 may calculate and provide the number of users who does not read each unspecified message object.

Meanwhile, the unread message processor 330 may perform processing for reading the specified message object and the unspecified message object as follows.

When the specified message object is read, the unread message processor 330 may allow the corresponding user to read the corresponding specified message object by providing a user reaction (user input such as click or touch) to the corresponding specified message object. That is, when the user reaction of the corresponding user is input to the specified message object, the unread message processor 330 may process the specified message object as read and may subtract the number of unread specified message objects.

When the unspecified message object is read, the unread message processor 330 can assume that the user has read the unspecified message objects in the message thread if any user participates in the dialog. That is, the unread message processor 330 may process the unspecified message object as read regardless of the user response and may subtract the number of unspecified message objects that is not read.

As a result, as described above, the unread message processor 330 may count and calculate the number of unspecified message objects and the number of specified message objects, respectively, in different ways.

The task object processor 340 may add, as a specified message object, a task object for a user to instruct a specific user to process a task to a message thread, and process the task object among the specified message object. Here, the task object corresponds to an independent message object used for processing a task in a dialog, and may include a task creator, a task handler, a task deadline, a task content, and a task state. The task creator may correspond to a task instructor capable of creating the task object, and the task handler may correspond to a task performer specified by the task creator. The task deadline may correspond to the deadline of the task specified by the task creator, and may be changed according to a spontaneous change of the task creator or a change request of the task handler, if necessary. The task content may include a simple text or a separate document that may be directed by the task creator. The task state is updated by the task creator or the task handler as the progress state of the task, and may correspond to an unconfirmed state, a pre-progress state, a progressing state, a post-progress state, an evaluation state, a completed state, or an overdue state.

The task object processor 340 detects whether the specified message object in the message thread corresponds to the task object. In one embodiment, the task object processor 340 may extract the task object from the message thread according to the request of the task handler and provide the extracted task object to the dialog.

The task object processor 340 may process the task object through the specified message processor. The specified message processor may refer to a process performed in the background, and may be performed by the task creator or the task handler or may be performed according to a specific event (for example: alarm according to a task schedule). The task object processor 340 may update a task state according to a predefined task processing flow through the specified message processor, and change the specified user according to the updated task state.

For example, the specified message processor may detect that [task handler B] receives <task object P> to set the task state to [unconfirmed state], and may detect that [task handler B] confirms <task object P> to change [unconfirmed state] to [pre-progress state]. The specified message processor may detect that [task handler B] proceeds to <task object P> to change [pre-progress state] to [progressing state], and detect that [task handler B] completes <task object P> to change the [progressing state] to [post-progress state] and change the specified user from [to-do handler B] to [to-do creator A]. The specified message processor may detect that the [to-do creator A] evaluates the <task object P> to change the [post-progress state] to [completed state].

The task object processor 340 may predict (before the task deadline passes) or detect (after the task deadline passes) that the [task handler B] passes the task deadline of the <task object P> to create a task deadline event as a specific event. For example, the specified message processor may receive the task deadline event and notify the [task handler B] of the task deadline to induce rapid task processing of the [task handler B] on the <task object P>. When the task object processor 340 receives the completed state from [task handler B], the task object processor 340 requests the [task creator A] to evaluate the task content as the specified message and changes the task state to the evaluation state. The task object processor 340 may change the specified user from the [to-do handler B] to the [to-do creator A] when the task state is changed to the evaluation state, and allow the [task creator A] to record the task evaluation in the <task object P>. In addition, the task object processor 340 may track the task state of the <task object P> and finally receive the evaluation on the <task object P> as a task rating from the [task creator A].

The task content reminder 350 may create the task deadline event as a specific event according to the task deadline in the task object. In one embodiment, the task content reminder 350 may periodically check the task deadline in the task object, and may create the task deadline event when the task deadline is imminent. The task content reminder 350 may define the imminence of the task deadline according to a user's setting, and for example, may set the imminence of the task deadline to one week before the task deadline by default.

The task content reminder 350 may wake up the specified message processor through the task deadline event, and the specified message processor may remind the task handler of the task content.

The task content reminder 350 may create a remind message during the reminder process. Here, the remind message may correspond to a specified message object specifying a user, and may be transmitted to the task handler at the time of reminding when the task handler is changed according to the task state of the task object. For example, when the task handler of the <task object P> is changed from the [task handler A] to the [task handler B], the task content reminder 350 may transmit the remind message as the specified message object to the [task handler B]. In addition, the task content reminder 350 may transmit to the [task handler B] the task content of the <task object P> with the remind message as the specified message object.

The task content reminder 350 may provide the task handler with the task creator, at least a portion of the task content, and the task deadline through the remind message.

The task content reminder 350 may detect an overdue of the task deadline and may continuously provide the task handler with the task content with a push notification when the task deadline passes. In one embodiment, the task content reminder 350 may provide the push notification regardless of the connection of the dialog by the task handler.

Figure 5:
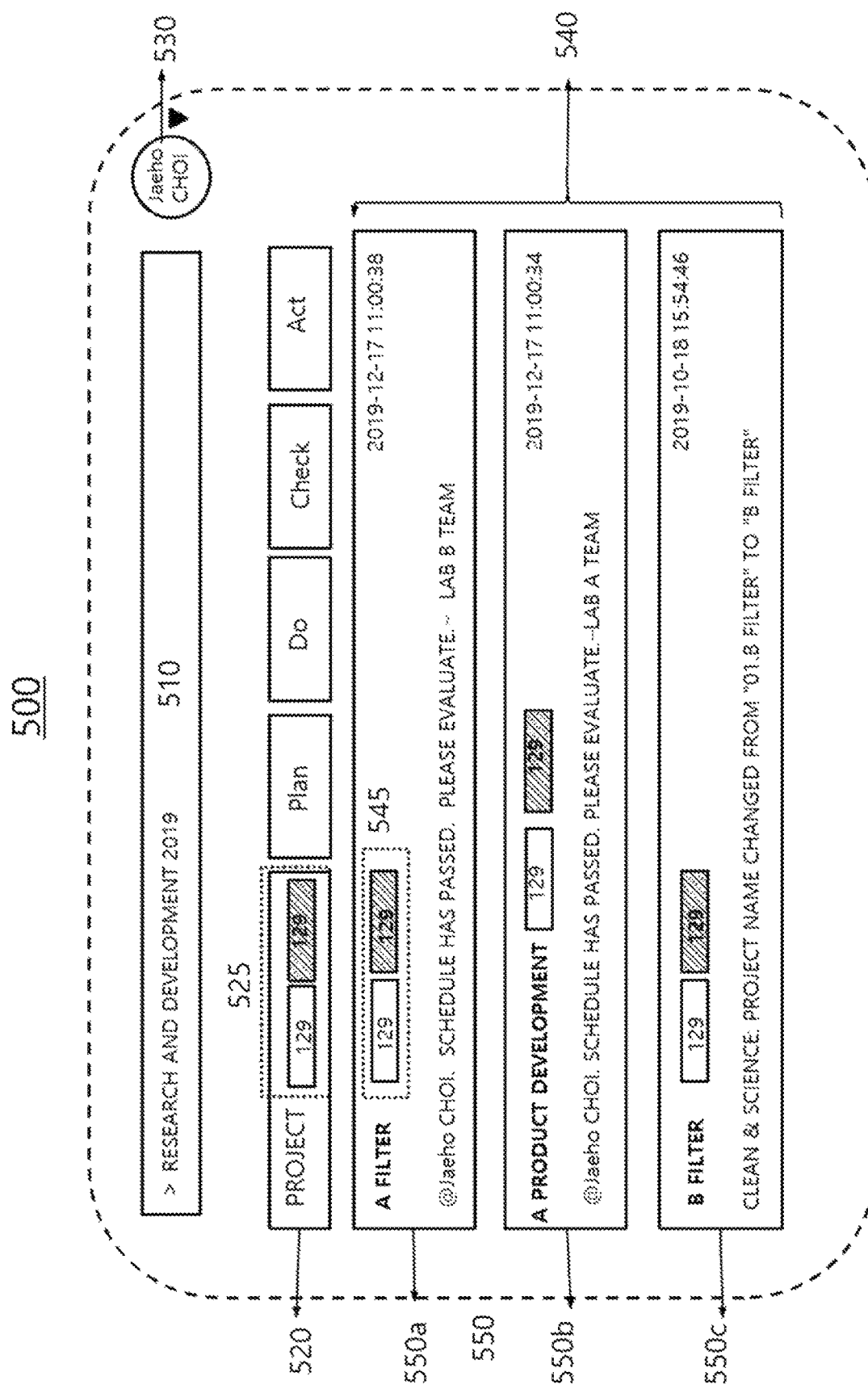
FIG. 5 is a diagram illustrating a dialog list user interface generated by the apparatus of processing a dialog based message object in FIG. 1.

The dialog badge processor 360 may provide the specified user with the number of unread message objects for the specified message object in the message thread as the badge of the dialog. Here, as illustrated in FIG. 5, the badge of the dialog may be implemented as an icon 545 in the dialog list before users participate in the dialog, and an icon 545 may include the number of unread message objects.

In addition, the dialog badge processor 360 may provide the number of specified message objects and the number of unspecified message objects for the specified user in the message thread at the same time as the badge of the dialog. The message thread may include five specified message objects and three unspecified message objects that specify [user A]. For example, when the [user A] has read one of the five specified message objects and one of the three unspecified message objects, the dialog badge processor 360 may provide the [user A] with the number of unread specified message objects as four and the number of unread unspecified message objects as two, respectively, as the badge of the dialog. That is, the dialog badge processor 360 may calculate the number of unread specified message objects and the number of unread unspecified message objects, respectively, for the corresponding user, and simultaneously provide as the badge of the dialog the number of unread specified message objects and unread unspecified message objects calculated.

The dialog badge processor 360 may provide as the badge of the dialog the number of its own unread specified message objects for the specified message object in the message thread, and provide as the badge of the dialog the number of unread specified message objects specifying the user to allow the specified user to more easily check the existence of the unread specified message object.

For example, it is assumed that the number of dialog participants is five, the number of specified message objects is ten, the number of specified message objects specifying the [specified user A] is three, and the number of specified message objects specifying the [specified user B] is five. When the [specified user A] has read two specified message objects, the dialog badge processor 360 can provide the number of its own unread message objects in the dialog layout as one.

The dialog badge processor 360 may provide the specified user with the number of unread message objects for the specified message object in the message thread and the number of unread message objects that the user does not read as the badge of the dialog.

The controller 370 may control the overall operation of the processor 210, and manage the control flow or the data flow between the dialog processor 310, the message object processor 320, the unread message processor 330, the task object processor 340, the task content reminder 350, and the dialog badge processor 360.

Figure 4:
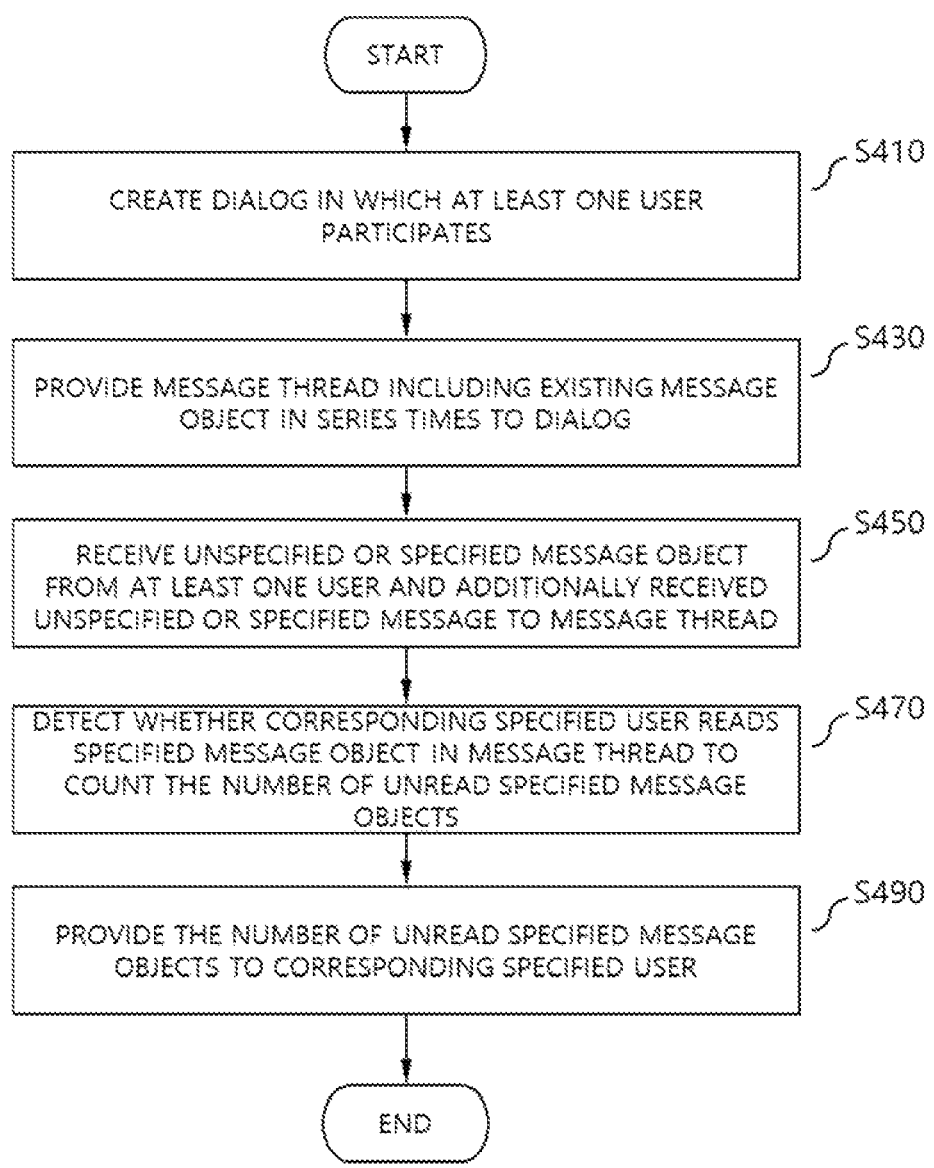
FIG. 4 is a flowchart for describing a process performed in the apparatus of processing a dialog based message object of FIG. 1.

FIG. 4 is a flowchart illustrating a process performed in the apparatus of processing a dialog based message object of FIG. 1.

In FIG. 4, the apparatus 110 of processing a dialog based message object may create a dialog participating by at least one user through the dialog processor 310 (step S410). For example, the dialog processor 310 may create [dialog X] in which the [user A] and the [user B] participate.

The dialog processor 310 may provide the dialog with a message thread including the existing message object spontaneously created by at least one user in time series (step S430). For example, the dialogue processor 310 may add [message object M] created by the [user A] to the message thread of the [dialog X] in which the [user A] participates in time series.

The message object processor 320 may receive an unspecified or specified message object from one of the at least one user and additionally insert the received unspecified or specified message object into the message thread (step S450).

For example, the message object processor 320 may additionally insert the [specified message object M] received from the [user A] into the message thread of the [dialog X].

The unread message processor 330 may detect whether the specified user has read the specified message object in the message thread and count the number of unread specified message objects (step S470). For example, the message thread of the [dialog X] may include the [specified message object M] which specifies the [specified user A], the unread message processor 330 may detect whether the [specified user A] provides the user reaction (user input such as a click or a touch) to the [specified message object M], and if detected, it may be determined that the [specified user A] has read the [specified message object M]. When the [specified message object M] is read, the unread message processor 330 may subtract one from the number of unread specified message objects.

The apparatus 110 for processing a dialog based message object may provide the number of unread specified message objects to the specified user through the unread message processor 360 (step S490). For example, if it is assumed that the [dialog X] includes five specified message objects that specify the [specified user A], and the [specified user A] has read one specified message, the unread message processor 360 may provide the [specified user A] with the number of unread message objects as four.

FIG. 5 is a diagram illustrating a dialog list user interface generated by the apparatus of processing a dialog based message object of FIG. 1.

Referring to FIG. 5, a dialog list user interface 500 includes a task organization control 510, a project control 520, a badge control 525, a user control 530, a dialog list control 540, and a dialog 550.

The task organization control 510 is a user interface representing a task organization within a company, and may be used when accessing a task organization to which users belong through a user input or when managing the task organization managed by the users. For example, the task organization control 510 may be used to access a management support office within a company.

The project control 520 is a user interface that summarizes a task flows for all tasks included in the project being performed by the task organization selected through task organization control 510. The task flow represents a plando-check-act (PDCA) process, and includes a PLAN process, a DO process, a CHECK process, and an ACT process, each of which has the badge control 525 including a badge for a message object arranged therearound.

The PLAN process includes a step of establishing a feasible plan by clarifying goals or policies, the DO process includes a step of measuring a progress of the plan as the plan is executed according to the plan, and the CHECK process includes a step of evaluating an achievement and manner of performance to review success or failure factors, and the ACT process includes a step of feed backing to a next plan through improvements and corrections.

The badge control 525 represents the number of unread specified message objects and the number of unread unspecified message objects, respectively, for the entire dialogs 550a-550c, and can be used to access the corresponding message object through the user input. In one embodiment, the badge control 525 may be updated as the number of unread specified and unspecified message objects increases or decreases. For example, the badge control 525 may highlight and display the number of unread specified message objects in red. In one embodiment, the badge control 525 may receive a user input (for example, click or touch) for each of the number of unread specified message objects and the number of unread unspecified message objects, and may provide the corresponding unread message object through a separate user interface.

The user control 530 represents a user who has accessed the dialog list user interface 500 and can change to another user through the user reaction (for example, click or touch).

The dialog list control 540 corresponds to a user interface that lists the dialogs 550 in order and allows access to a particular dialog 550a through the user input. In one embodiment, the dialog list control 540 may arrange the dialogs 550 in the order of the dialog 550 in which the most recent conversation takes place. In another embodiment, the dialog list control 540 may arrange the dialogs 550 in the order of the dialogs 550 including the specified message object for the most recently generated specified user.

The badge control 545 may provide the number of unread specified message objects and the number of unread specified message objects for each of the dialogs 550 shown through the dialog list control 540. For example, for the specified user A of the user control 530, the badge control 525 may provide the number [9 (red)] of unread specified message objects and the number [10] of unread unspecified message objects in the dialog 550a. In one embodiment, the badge control 545 may receive the user input (for example, click or touch) for each of the number of unread specified message objects and the number of unread unspecified message objects, and may provide the corresponding unread message object through a separate user interface.

In FIG. 5, the dialog list user interface 500 may receive the user input (for example, touch) for the dialog 550a in the dialog list control 540, and the contents thereof will be described with reference to FIG. 6.

Figure 6:
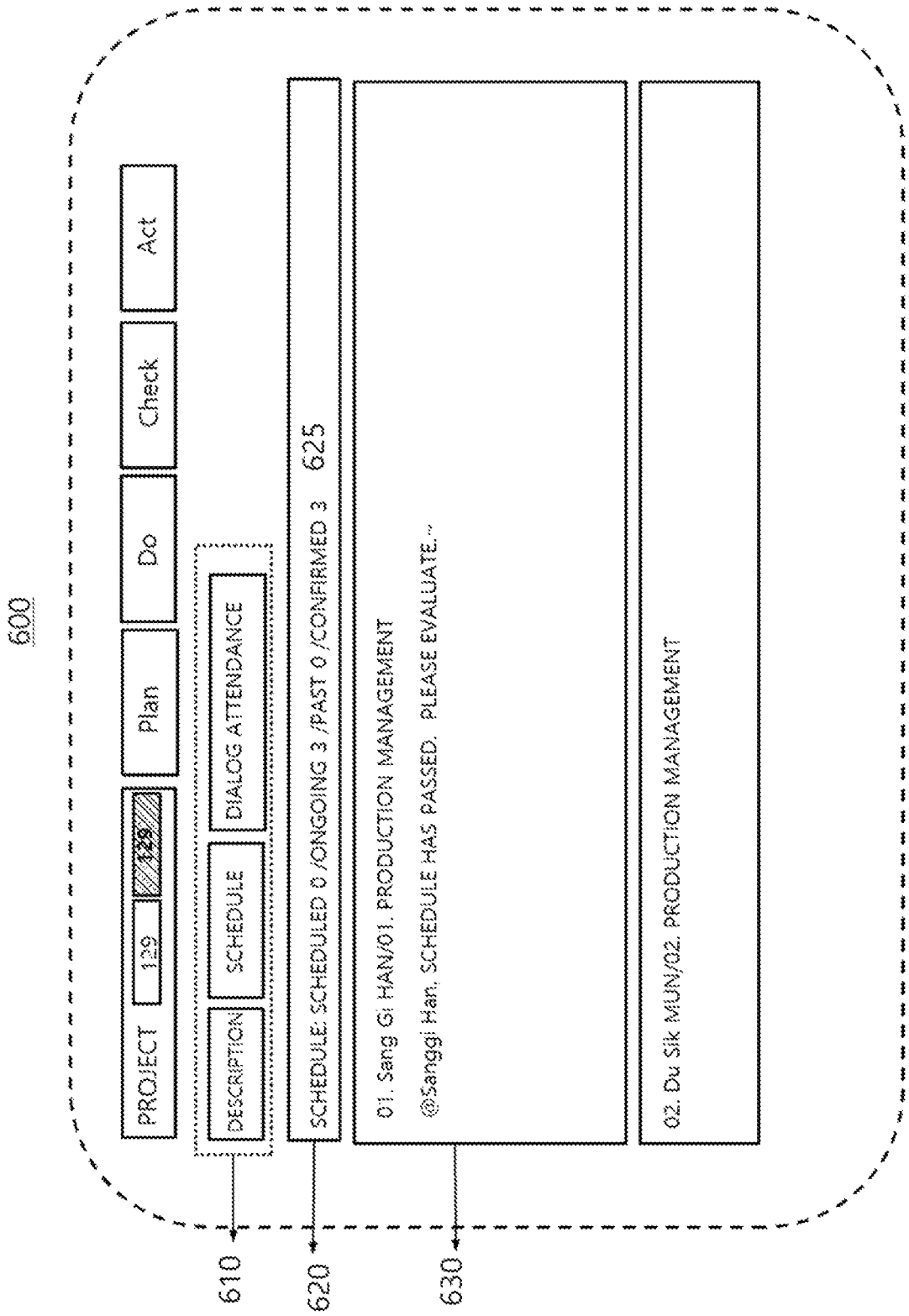
FIG. 6 is a diagram for describing a process of processing a task object created by the apparatus of processing a dialog based message object in FIG. 1.

FIG. 6 is a diagram illustrating a process of processing a task object created by the apparatus of processing a dialog based message object of FIG. 1.

The dialog task interface 600 of FIG. 6 may be accessed through the dialog 550, and the contents of the dialog list user interface 500 of FIG. 5 will be omitted.

Referring to FIG. 6, the dialog task interface 600 includes a project task control 610, a task schedule control 620, and a message thread control 630.

The project task control 610 can be used to control a description, a schedule, and dialog attendance of a project associated with the dialog 540. Here, the project description includes brief contents prepared by an administrator for the project, the schedule includes a task schedule of the project, and the dialog participant may be used to know users who are participating in the project.

The task schedule control 620 may provide progress states of the task objects to be used to control the task objects for each progress state. The progress states of the task objects may be divided into scheduled (that is, including unconfirmed state and pre-progress state), ongoing (that is, including progressing state and post-progress state), past (that is, overdue state), and confirmed (completed state and evaluation state), each of which may represent the number of task objects.

The message thread control 630 may provide a message thread composed of the message objects created in the dialog 540 in time series and may be used for a user to control a specific message object through the user input (for example, click or touch). For example, when the message object corresponds to the unspecified message object, the message thread control 630 may request a user who transmits the corresponding unspecified message object through the user input to prepare the specified message object. In another example, the message thread control 630 detects that the user is a specified user when the message object corresponds to the specified message object, and if so, the message thread control 630 may process that the corresponding message object (for example, a task object) is checked, and if not, the message thread control 630 may request the user to prepare the specified message object in the same manner as the unspecified message object.

In FIG. 6, the dialog task interface 600 may receive the user input (for example, click or touch) for the task schedule 625 in the task schedule control 620 to more specifically indicate the progress states of the task objects. The contents thereof will be described with reference to FIG. 7.

Figure 7:
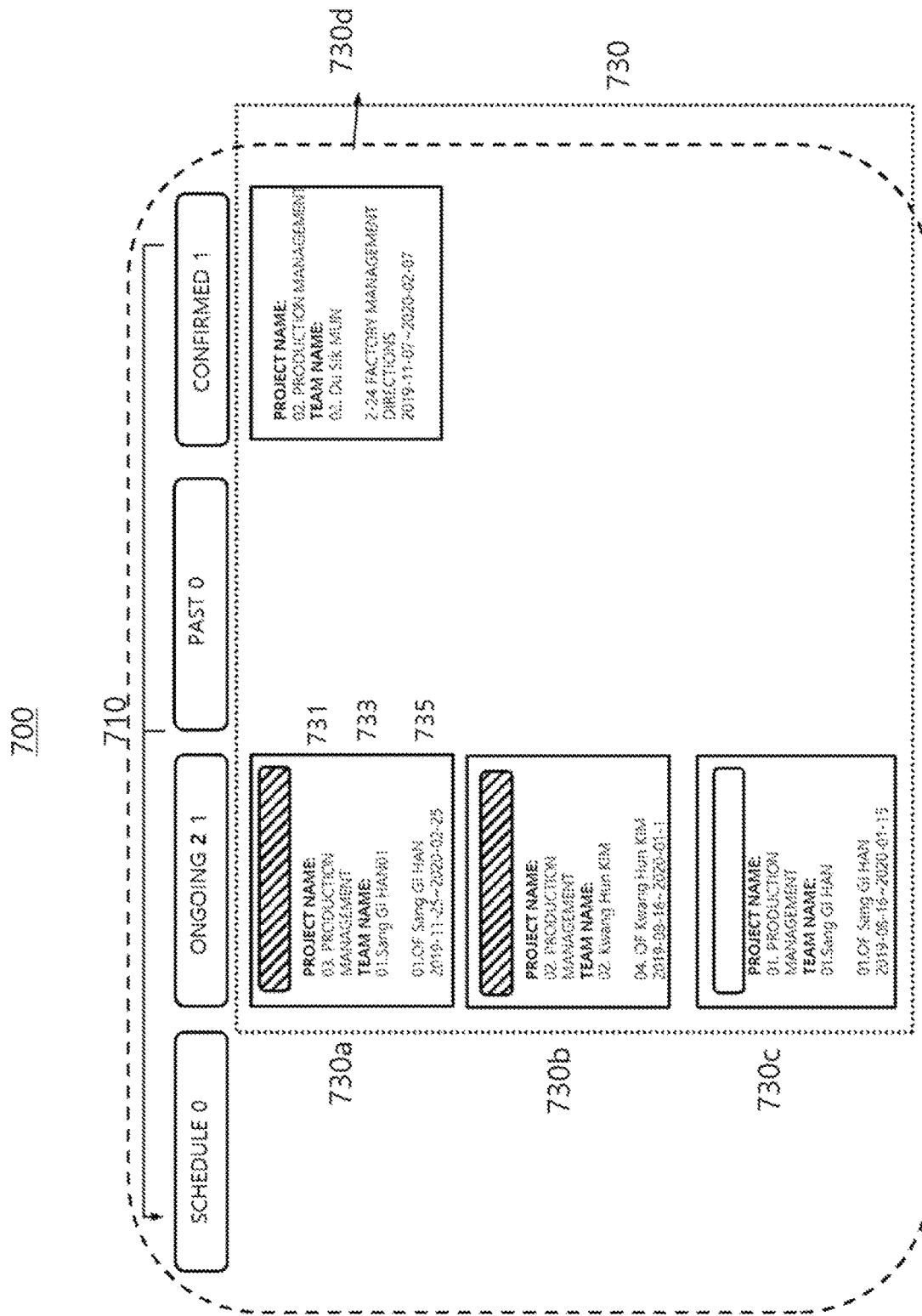
FIG. 7 is a diagram for describing task objects for each task state created by the apparatus of processing a dialog based message object in FIG. 1.

FIG. 7 is a diagram for describing task objects for each task state created by the apparatus of processing a dialog based message object of FIG. 1.

A task object interface 700 for each task state of FIG. 7 may be accessed through the task schedule control 620, and the contents of the dialog list user interface 500 and the dialog task interface 600 of FIGS. 5 and 6 will be omitted.

Referring to FIG. 7, the task object interface 700 for each task state includes a task progress control 710 and a task object control 730.

In FIG. 7, the task object interface 700 for each task state represents task objects for each task state, and may be generated to provide a task object given to the specified user for each task state to help the task convenience of the specified user.

The task progress control 710 classifies task objects for each task state and may include, for example, scheduled, ongoing, past, and confirmed.

The task progress control 710 may be provided to visually identify the number of unread specified message objects and the number of unread unspecified message objects around the task state (for example, scheduled, ongoing, past, and confirmed), and receive the user input (for example, click or touch) to separately provide the corresponding message object. For example, when the number [2] of unread specified message objects in the task state [ongoing] is selected through the user input, the task progress control 710 may provide two unread specified message object to a separate user interface or the user interface at the bottom of the corresponding task state.

The task object control 730 may be aligned with the identified task state at the bottom of the task progress control 710. The task object control 730 may summarize an indicator 731 indicating whether a task deadline approaches or passes, an indicator 733 indicating a task creator, and an indicator 735 indicating a task deadline. For example, the task object control 730 may receive the user input and provide the task object to a separate user interface in detail.

Figure 8:
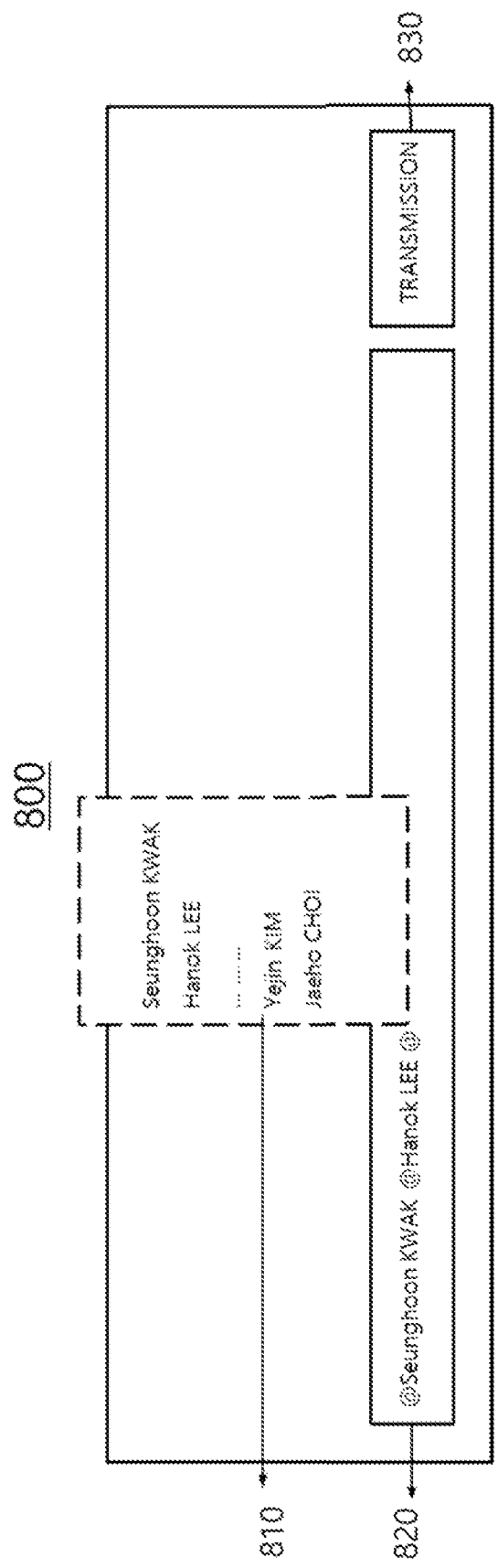
FIG. 8 is a diagram for describing message transmission performed in the apparatus of processing a dialog based message object of FIG. 1.

FIG. 8 is a diagram for describing message transmission performed in the apparatus of processing a dialog based message object of FIG. 1.

Referring to FIG. 8, a message transmission interface 800 includes a user-specified control 810, a message editing control 820, and a message transmission control 830.

The user-specified control 810 may be used to specify a specified user, and may provide as a list a dialog participant participating in a current dialog to receive an instruction (for example, special character [@]) to specify the specified user through a message object creator (for example, user A) so that it can be selected by the message object creator. In one embodiment, the user-specified control 810 may designate a plurality of specified users by sequentially inputting the special character [@].

The message editing control 820 may receive a message object as text characters or as specific objects (for example, a picture object, a video object, a document object, and a task object), and transmit the message object to the corresponding user through the message transmission control 830.

Although exemplary embodiments of the present invention have been disclosed hereinabove, it may be understood by those skilled in the art that the present invention may be variously modified and altered without departing from the scope and spirit of the present invention described in the following claims.

The disclosed technology can have the following effects. However, since a specific embodiment is not construed as including all of the following effects or only the following effects, it should not be understood that the scope of the disclosed technology is limited to the specific embodiment.

The apparatus of processing a dialog based message object and the method thereof according to the embodiment of the present invention can smoothly perform the task through the interaction between users.

The apparatus of processing a dialog based message object and the method thereof according to the embodiment of the present invention can definitely understand the message object provided to the specified user by implementing the message object by identifying the non-specified message object and the specified message object.

The apparatus of processing a dialog based message object and the method thereof according to the embodiment of the present invention can enable both the message provider and the message recipient to efficiently manage the specified message by detecting whether to read the specified message object.

The apparatus of processing a dialog based message object and the method thereof according to the embodiment of the present invention can use the task object as one type of the specified message object to manage the task processing flow.

What is claimed is:

1. An apparatus of processing a dialog based message object, comprising:
a memory and a processor electrically connected to the memory,
wherein the processor
creates a dialog in which at least one user participates,
provides the dialog with a message thread including an existing message object spontaneously created by the at least one user,
receives an unspecified and specified message object from one of the at least one user and additionally inserts the received unspecified and specified message object into the message thread,
detects whether a corresponding specified user reads the specified message object in the message thread to count a number of unread specified message objects,
provides the corresponding specified user with the number of unread specified message objects and a number of unread unspecified message objects of the at least one user for the specified message object and the unspecified message object in the message thread, and
provides the corresponding specified user with the number of unread specified message objects and the number of unread unspecified message objects for the message object in the message thread as a badge of the dialog,
wherein the number of unread unspecified message objects include only unspecified message objects and the number of unread specified message objects include only specified message objects, and
wherein the specified message object includes a message object that specifies a specific user, and the unspecified message object includes a message object that does not specify a specific use.

2. The apparatus of processing a dialog based message object of claim 1, wherein the processor
detects whether the specified message object corresponds to a task object that includes a task creator, a task handler, a task content, and a task state that corresponds to an independent message object used for task processing within the dialog, and
updates the task state by the task creator or the task handler.

3. The apparatus of processing a dialog based message object of claim 2, wherein the processor
updates the task state according to a predefined task processing flow through a specified message processor that is performed by the task creator or the task handler or performed according to a specific event, and
changes the corresponding specified user according to the updated task state.

4. The apparatus of processing a dialog based message object of claim 3, wherein the processor requests the task creator to evaluate the task content as the specified message object and records the task evaluation in the task object when the task handler receives a task completion as the task state.

5. The apparatus of processing a dialog based message object of claim 3, wherein the processor creates a task deadline event as the specific event according to a task deadline in the task object to remind the task handler of the task content as the specified message object through the specified message processor.

6. The apparatus of processing a dialog based message object of claim 5, wherein the processor continuously provides the task handler with the task content as a push notification regardless of a connection of the dialog by the task handler when the task deadline passes.

7. The apparatus of processing a dialog based message object of claim 2, wherein the processor adds the task object to the message thread as the specified message object.

8. The apparatus of processing a dialog based message object of claim 7, wherein the processor extracts the task object from the message thread according to a request of the task handler and provides the extracted task object to the dialog.

9. The apparatus of processing a dialog based message object of claim 1, wherein the processor
    detects a connection of the corresponding specified user, and
    provides a specified user connection event to a specified message processor when the number of unread specified message objects is one or more to inform the dialog of existence of the unread specified message object.

10. A method of processing a dialog based message object performed by an apparatus of processing a dialog based message object including a memory and a processor electrically connected to the memory, the method comprising:
    creating a dialog in which at least one user participates;
    providing a dialog with a message thread including an existing message object spontaneously created by the at least one user;
    receiving an unspecified and specified message object from one of the at least one user and additionally inserting the received unspecified and specified message object into the message thread;
    detecting whether a corresponding specified user reads the specified message object in the message thread to count a number of unread specified message objects;
    providing the corresponding specified user with the number of unread specified message objects and a number of unread unspecified message objects of the at least one user for the specified message object and the unspecified message object in the message thread; and
    providing the corresponding specified user with the number of unread specified message objects and a number of unread unspecified message objects for the message object in the message thread as a badge of the dialog,
    wherein the number of unread unspecified message objects include only unspecified message objects and the number of unread specified message objects include only specified message objects, and
    wherein the specified message object includes a message object that specifies a specific user, and the unspecified message object includes a message object that does not specify a specific user.

11. A non-transitory computer-readable medium having embodied thereon a program, which when executed by a computer causes the computer to execute a method for processing a dialog based message object, the method comprising:
    creating a dialog in which at least one user participates;
    providing a dialog with a message thread including an existing message object spontaneously created by the at least one user;
    receiving an unspecified and specified message object from one of the at least one user and additionally inserting the received unspecified and specified message object into the message thread;
    detecting whether a corresponding specified user reads the specified message object in the message thread to count a number of unread specified message objects;
    providing the corresponding specified user with the number of unread specified message objects and a number of unread unspecified message objects of the at least one user for the specified message object and the unspecified message object in the message thread; and
    providing the corresponding specified user with the number of unread specified message objects and a number of unread unspecified message objects for the message object in the message thread as a badge of the dialog,
    wherein the number of unread unspecified message objects include only unspecified message objects and the number of unread specified message objects include only specified message objects, and
    wherein the specified message object includes a message object that specifies a specific user, and the unspecified message object includes a message object that does not specify a specific user.

12. The apparatus of processing a dialog based message object of claim 1, wherein the processor is further configured to provide the corresponding specified user with a number of users who did not read the unspecified message object.

\* \* \* \* \*